June 12, 1928.                    1,673,056
J. L. STOLTZ
VEHICLE WHEEL
Filed Dec. 22, 1924
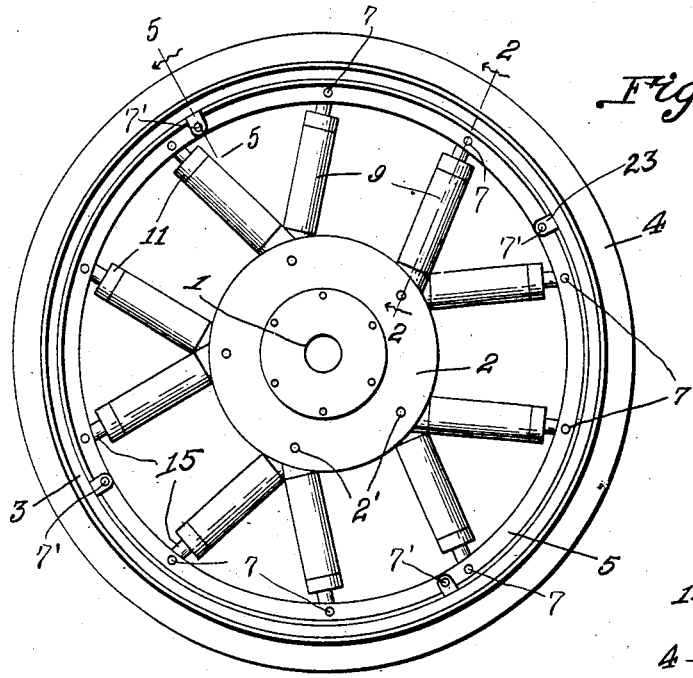
Fig.1.
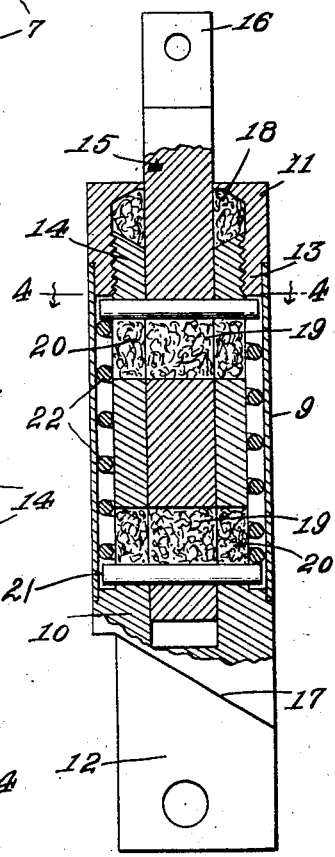
Fig.3.
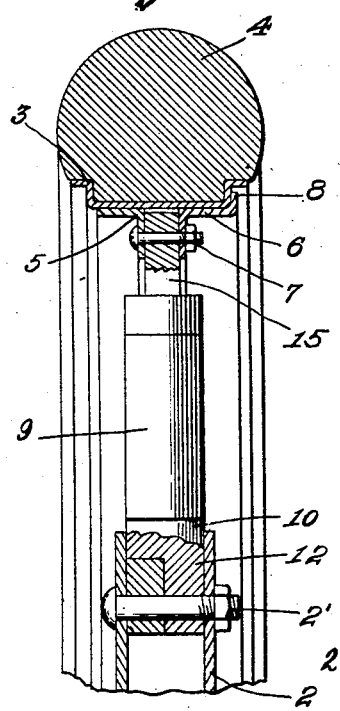
Fig.2.
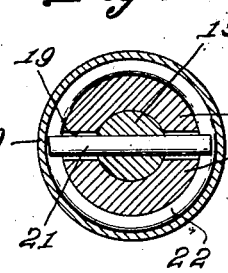
Fig.4.
Fig.5.
John L. Stoltz
INVENTOR
BY Victor J. Evans
ATTORNEY Patented June 12, 1928.

1,673,056

UNITED STATES PATENT OFFICE.

JOHN L. STOLTZ, OF SUMNER, ILLINOIS.

VEHICLE WHEEL.

Application filed December 22, 1924. Serial No. 757,507.

This invention relates to vehicle wheels and more particularly to what is known in the art as a spring wheel. The main object of my invention is the provision of a motor vehicle wheel wherein the spokes of the wheel are provided with suitable cushioning springs whereby to absorb the shock and jar usually conveyed to the vehicle while passing over rough and uneven roads.

Another object of my invention is the provision of a spring wheel wherein the spokes which are provided with cushioning members, are connected to the rim and hub of the wheel in such a manner as to more evenly distribute the absorption power of the spring.

With the above and other objects in view, the invention consists in the novel features of construction, the combination and arrangements of parts hereinafter more fully set forth, pointed out in the claim and shown in the accompanying drawings, in which:

Fig. 1 is a side elevation of the vehicle wheel constructed in accordance with my invention.

Fig. 2 is a detailed sectional view on the line 2—2 of Fig. 1.

Fig. 3 is a longitudinal sectional view of one of the spokes.

Fig. 4 is a transverse section on the line 4—4 in Fig. 3.

Fig. 5 is a transverse section on the line 5—5 in Fig. 1.

Referring more particularly to the drawings numeral 1 indicates the hub of the wheel having spaced plates 2 attached thereto. 3 represents a rim of any well-known type and 4 a solid rubber tire mounted upon the rim.

The rim is channel shape in cross section as shown in Fig. 2 and arranged upon the inner side of the felly are the angular plates 5 and 6 connected by means of the bolts 7. The rim provides lugs 23 to which the plates 5 and 6 are connected by means of bolts 7'. The plate 6 has an annular flange 8 which embraces one side wall of the felly 2 as shown in Fig. 2. The spokes include a sleeve 9. a head 10 at one end of the sleeve and a cap 11 at the other end of the sleeve. The head 10 is provided with a perforated tongue 12 adapted to be disposed between the plates 2 and connected thereto by means of the bolt 2' as shown in Fig. 2.

The cap 11 is provided with a reduced portion 13 inserted into one end of the sleeve as shown in Fig. 3 and arranged within this cap is a bearing sleeve 14 which is threaded into the cap and adapted to embrace the movable rod 15 which extends through an opening in the outer end of the cap. The outer end of the rod 15 is provided with a reduced perforated portion 16 which is engaged between the side portions of the plates 5 and 6 and connected thereto by means of the bolts 7.

At this point I wish to call attention to the fact that the members 10 are cut at an angle as shown at 17 so that the tongues 12 may be arranged in overlapping relation as shown in Fig. 1 and two of them connected to one of the bolts 2', thus positioning the spokes on an angle with respect to the hub.

The cap 11 is provided with a space between the outer threaded end of the bearing sleeve 14 and the end wall of the cap whereby suitable lubricate packing 18 may be arranged around the rod 15. The rod 15 and the sleeve 14 are provided with transverse slots 19 and 20 respectively in which cross pins 21 are movable, one of these cross pins being disposed adjacent the inner end of the rod while the other is disposed at its intermediate portion and arranged between these rods 21 is a coil spring 22 which embraces the sleeve 14 and is arranged within the sleeve 9 whereby the ends of the pins 21 will engage the ends of the spring.

Suitable lubricating material is placed within the slots 19 and 20 in order to thoroughly lubricate the pins 21 in their movement through the slots. It will be apparent from the foregoing that when the wheel strikes an object opposite the ends of the spokes, the shock will be taken up through the movement of the rod 21 and through the head member 10 or the cap 11 against the tension of the spring 22, the pins 21 moving through the slots 19 and 20 against the ends of the springs in accordance with the direction in which the shock moves the rod 15. It will be apparent that a portion of the shock will be taken up on the opposite side of the wheel in order to prevent a quick rebound on the part of the body.

It will be apparent that my improved wheel is extremely simple in construction and can be manufactured and placed upon the market at an extremely low cost.

While I have shown and described the preferred embodiment of my invention it will be understood that various changes and alterations may be made without departing from the spirit of the invention or the scope of the appended claim.

Having thus described my invention, what I claim is:

In a spoke construction for resilient wheels, a section including a head, a bearing sleeve formed as a part of the head, a nut member threaded upon the outer end of the sleeve, a rod adapted for telescopical relation with the sleeve and projecting through the nut member, said rod member and said sleeve having alinged slots formed therein for the accommodation of a lubricant, pin members arranged in these slots for connecting said rod member and sleeve together for telescopical movement, a cushion member embracing the sleeve and having its end portions engaging the pin members, and a second sleeve providing a housing for said cushion member and having its end portions embracing the head and the nut member.

In testimony whereof I affix my signature.

JOHN L. STOLTZ.